United States Patent

[11] 3,613,634

[72] Inventors John J. Fiedorowicz
Cromwell;
Romeo L. Lamonde, East Hartford, both of Conn.

[21] Appl. No. 872,647
[22] Filed Oct. 30, 1969
[45] Patented Oct. 19, 1971
[73] Assignee United Aircraft Corporation
East Hartford, Conn.

[54] STRAND IMPREGNATION APPARATUS
3 Claims, 2 Drawing Figs.

[52] U.S. Cl. .......... 118/50, 118/68, 118/405
[51] Int. Cl. .......... C23c 13/10
[50] Field of Search .......... 118/DIG. 18, 19, 405, 404, 50, 50.1; 117/119, 119 A

[56] References Cited

UNITED STATES PATENTS

| | | | |
|---|---|---|---|
| 839,191 | 12/1906 | Passburg | 118/50 |
| 874,287 | 12/1907 | Bayne et al. | 118/405 X |
| 1,144,595 | 6/1915 | Henderson | 118/405 X |
| 1,154,447 | 9/1915 | Sleeper | 118/50 |
| 1,826,297 | 10/1931 | Apple | 118/405 X |
| 1,958,984 | 5/1934 | Beaver | 118/50 |
| 2,203,241 | 6/1940 | Waldron | 118/50 |
| 2,257,373 | 9/1941 | Fanselow | 118/405 X |
| 3,473,511 | 10/1969 | Metz et al. | 118/50 |
| 3,480,499 | 11/1969 | Paw, Jr. | 118/405 X |

*Primary Examiner*—Morris Kaplan
*Attorney*—Charles A. Warren

ABSTRACT: Strand immersion means include vertically aligned and spaced-apart funnels disposed within a vacuum system. Strand supply and heating means are disposed within the vacuum system.

12
42
14
18
16
10
22
30
40
38

3,613,634
PATENTED OCT 19 1971
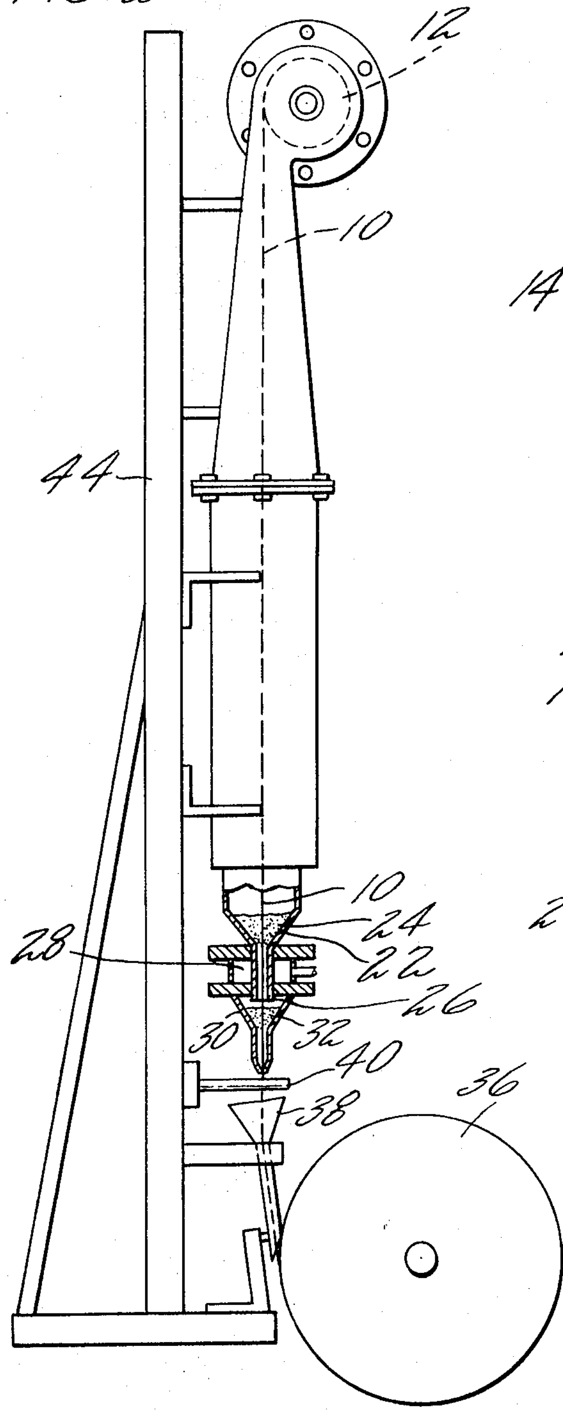
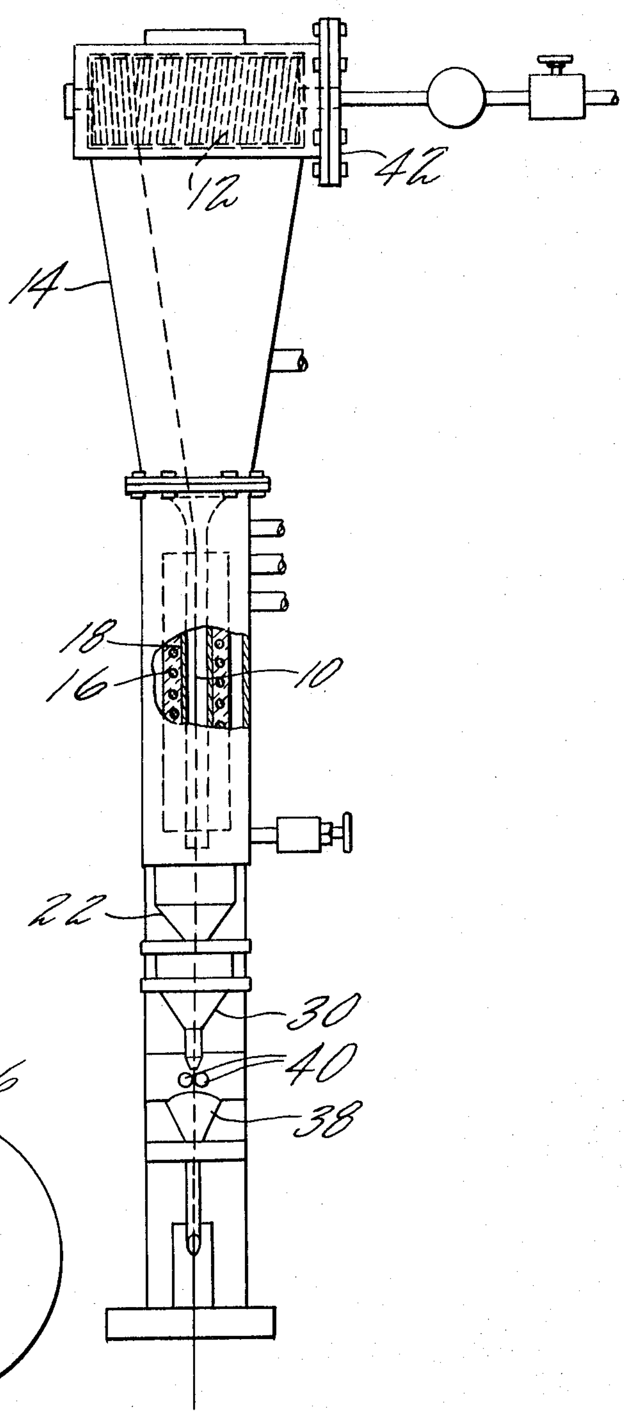
INVENTORS
JOHN J. FIEDOROWICZ
ROMEO L. LAMONDE
BY Charles A. [illegible]
ATTORNEY

STRAND IMPREGNATION APPARATUS

SUMMARY OF INVENTION

A feature of the invention is the heating of the fiber in a vacuum chamber to remove any contaminants and the subsequent drawing of the fiber through a treatment funnel in the wall of the chamber by which to impregnate or coat the fiber. Another feature is a secondary vacuum chamber at the outlet of the funnel with a second treatment funnel through which the fiber is drawn out of the secondary chamber.

According to the present invention, the need of fiber strand is placed in a vacuum chamber and is drawn through a heater for the removal of contaminants and then through a treatment funnel into a secondary vacuum chamber, and through a second treatment funnel in the wall of the secondary chamber.

BRIEF DESCRIPTION OF THE DRAWING

FIG. 1 is a diagrammatic front view of the device.

FIG. 2 is a diagrammatic side view of the device of FIG. 1.

DESCRIPTION OF THE PREFERRED EMBODIMENT

The yarn or fiber 10 to which the invention is directed is a high strength high modulus fiber such as graphite or Borsic. This filament is wound on a reel 12 positioned in a vacuum chamber 14, and is fed through an annular heater 16, for example, a resistance or heater. A glass tube 18 within the heater guides the filament as it passes through the heater. Vacuum is maintained in the chamber by a pump, not shown, connected to a duct 20. The heater combined with the vacuum removes any contaminants and gases in the yarn.

From the heater, the fiber passes through a treatment funnel 22 in the wall of the vacuum chamber. This funnel is positioned vertically and is partially filled with a resin 24 wt which the fiber is impregnated or coated. The resin used, where the fiber is a carbon fiber may be an epoxy resin system such as BP 907 a commercial resin obtainable from American Cyanamid. The funnel orifice 26 is substantially the dimension of the yarn or fiber with a small clearance for the resin thereon. This orifice is surrounded by a secondary vacuum chamber 28 which has a lower vacuum than the main chamber but serves to provide such a low differential on opposite ends of the funnel that the vacuum desired may be held in the main chamber. For example, a desirable vacuum in the main chamber is 25 microns and a suitable vacuum in the secondary chamber is 15 inches of mercury when the fiber being treated is carbon.

In line with the treatment funnel 22 and in the opposite wall of the secondary chamber is a secondary treatment funnel 30, also filled with the same or another coating compound 32 such as the resin above described. The outlet or orifice 34 for the funnel is open to atmosphere so that the coated and/or impregnated fiber is drawn from this orifice into the atmosphere. The two funnels combined with the secondary vacuum chamber serve as an air lock for the main chamber. The orifice 34 is slightly larger than the fiber to allow for the coating thereon. If the yarn or fiber is a carbon fiber, the diameter may be 0.008 inches, the first funnel orifice could be 0.012 inches and the second funnel orifice could be 0.010 inches.

The coated yarn is wound on a mandrel 36, being guided onto the mandrel by a guide tube 38 which may be moved by any well-known device, not shown, for uniform distribution of the fiber across the surface of the mandrel. A suitable tensioning device, such as a pair of closely spaced glass rods 40 resiliently urged together may be used to maintain a tension on the fiber as it is wound on the mandrel.

Suitable temperature and vacuum controls, not a part of the present invention, may be used to determine the desired coating conditions, and where necessary the temperature of the coating in two funnels may also be controlled. A suitable cap 42 may provide access to the main chamber for replacement of the reel 12 when the latter is empty and the entire device may be mounted on a suitable support 44.

We claim:

1. In a device for the impregnation or coating of fiber strands a vacuum chamber, heating means within the chamber having a passage through which the strand is drawn, support means in the chamber for a supply of the fiber a funnel having impregnant therein through which the fiber is fed from said heating means, said funnel being positioned in and at the bottom wall of the vacuum chamber and the discharge end of said funnel being located within a secondary vacuum chamber, a second funnel having an impregnant therein receiving the fiber from said first funnel and being located in the wall and at the bottom of said secondary chamber, and strand tensioning means disposed subsequent to said second funnel and adapted to receive the twice impregnated strand.

2. A device as in claim 1 in which a mandrel is provided on which the impregnated fiber is wound from said second funnel, said mandrel being external to both vacuum chambers.

3. A device as in claim 2 in which the funnels have a discharge opening substantially the dimension of the fiber.